United States Patent [19]
Losos

[11] Patent Number: 4,804,467
[45] Date of Patent: Feb. 14, 1989

[54] WATER FILTER ASSEMBLY

[75] Inventor: Gus Losos, Palos Hills, Ill.

[73] Assignee: Hurley Chicago Co., Inc., Alsip, Ill.

[21] Appl. No.: 92,726

[22] Filed: Sep. 3, 1987

[51] Int. Cl.⁴ .............................................. B01D 27/02
[52] U.S. Cl. ...................................... 210/232; 210/282
[58] Field of Search ................................ 210/232, 282

[56] References Cited

U.S. PATENT DOCUMENTS

| | | | |
|---|---|---|---|
| 3,002,870 | 10/1961 | Belgarde et al. | 156/70 |
| 3,037,633 | 6/1962 | Veitel etal. | 210/232 |
| 3,447,687 | 6/1969 | Caterbury | 210/232 |
| 3,513,980 | 5/1970 | Masaschi | 210/238 |
| 3,529,726 | 9/1970 | Keenan | 210/282 |
| 4,231,872 | 11/1980 | Kell | 210/93 |
| 4,465,595 | 8/1984 | Cooper | 210/238 |
| 4,606,823 | 8/1986 | Lucas | 210/282 |

Primary Examiner—Ivars Cintins
Attorney, Agent, or Firm—WIllian Brinks Olds Hofer Gilson & Lione Ltd.

[57] ABSTRACT

A portable water filter assembly is provided with a filter canister secured to a removable base unit to permit replacement and cleaning of the filter elements. The base is sealingly secured to the canister to prevent any leakage through the use of a sealing device. A tamper-proof fitting at the water supply connection serves to prevent servicing of the unit and changing the filter element by other than qualified personnel.

7 Claims, 3 Drawing Sheets

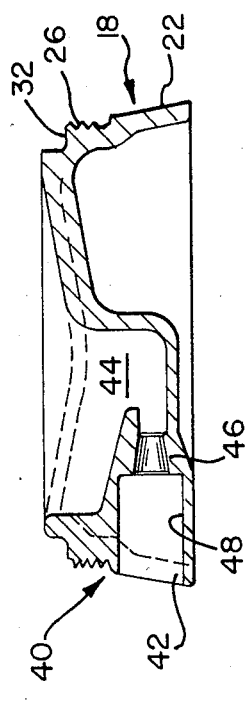
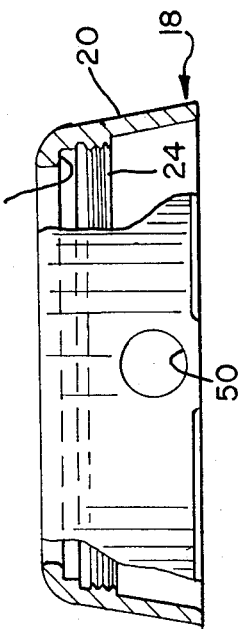
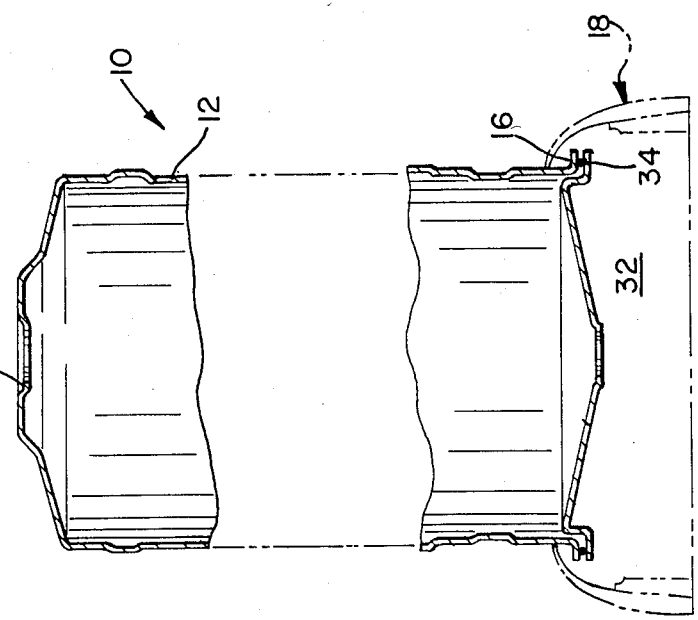

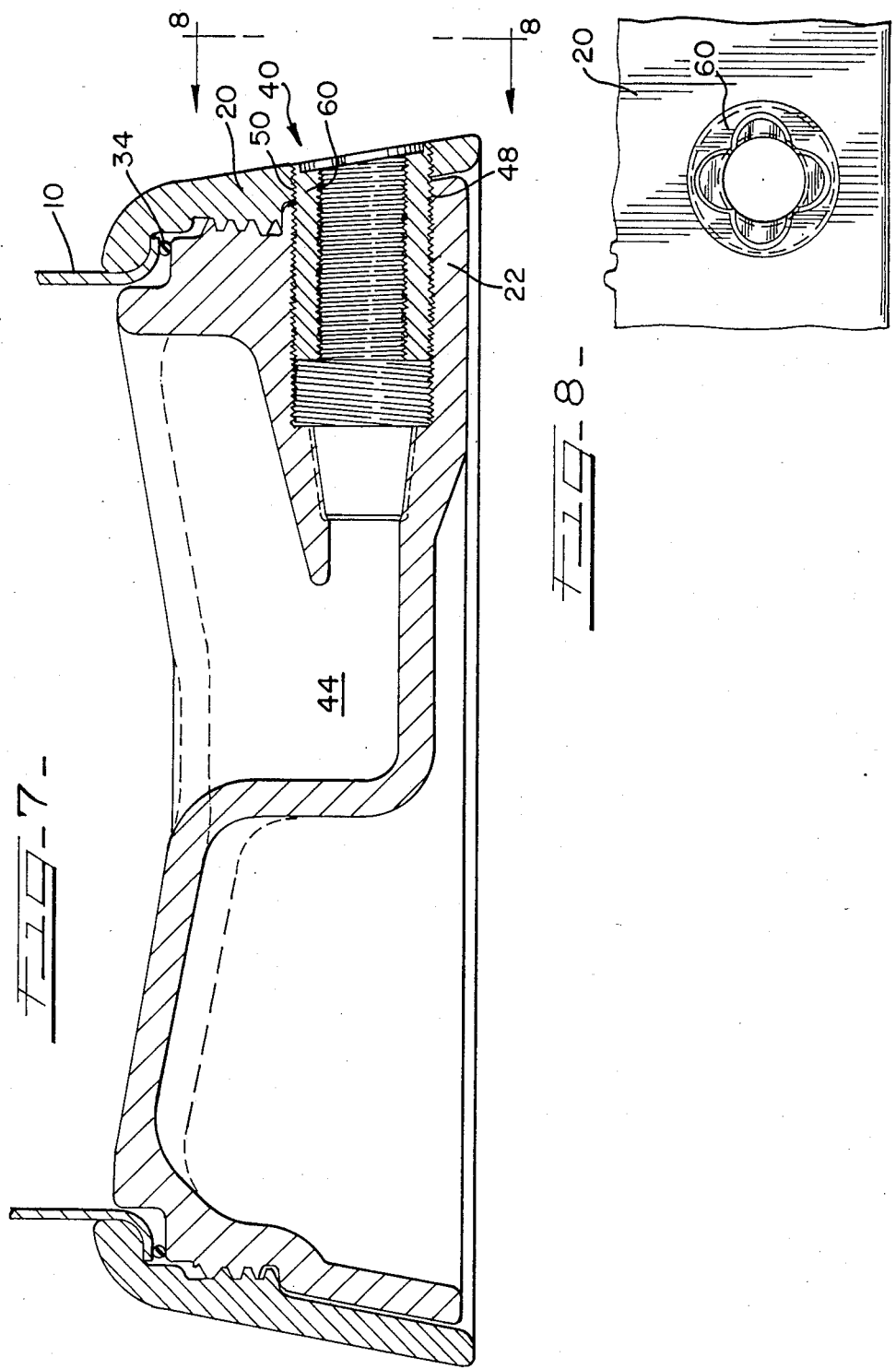

WATER FILTER ASSEMBLY

BACKGROUND AND SUMMARY OF THE INVENTION

The present invention relates to filters and in particular to a portable water filter designed to eliminate contaminants from a water supply.

In the preferred embodiment, the water filter of the present invention includes a canister secured to a removable base to permit replacement and cleaning of the filter element. The base is secured to the canister to prevent any leakage through the use of a sealing device. A tamper-proof fitting and tool serve as a key-removable lock to prevent servicing of the unit and changing the filter elements by other than qualified personnel.

In accordance with the above and other objects of the present invention, a water filter is provided which enables the replacement of filter elements and granular activated carbon by qualified personnel.

In accordance with another object of the present invention, the base assembly provides a tamper-resistant means to prevent unqualified personnel from attempting to change the filter cartridge.

BRIEF DESCRIPTION OF THE DRAWINGS

FIG. 1 is a perspective view of a water filter made in accordance with the present invention;

FIG. 2 is a vertical section of the inner base element of the present invention;

FIG. 3 is a sectional view of the outer base element of the present invention;

FIG. 7 is a cross-sectional view of yet another embodiment of the invention; and FIG. 8 is a view of a keyway of the invention.

DESCRIPTION OF THE PREFERRED EMBODIMENT

Figure 4:
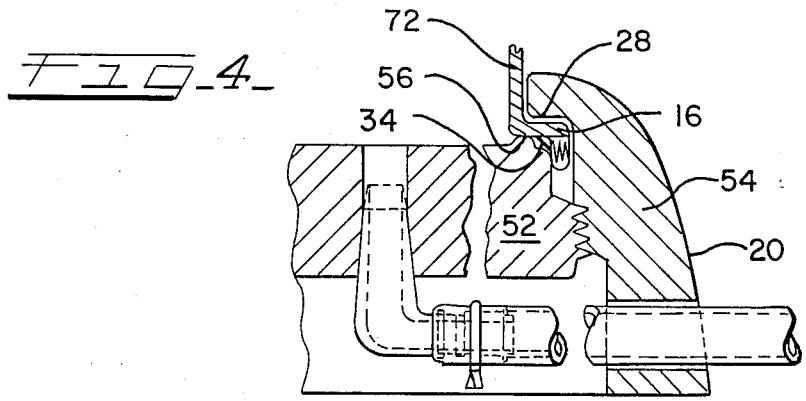
FIG. 4 is a cross-sectional view of another embodiment of the present invention.

Referring now to the drawings, and in particular to FIG. 1, the water filter generally designated 10 of the present invention includes an upper canister 12 which preferably is made of stainless steel or a similar non-corrosive material for use in the water filtering environment. A suitable fitting 14 on the top of the canister 12 connects with a tap or spout which does not form a part of the present invention. The canister 12 is adapted to enclose a generally cylindrical filter cartridge to filter impurities and the like from a water supply. The bottom, open end of the canister 12 includes an outwardly extending flange 16 for engagement with a base generally designated 18. The base assembly 18 forms a seal with the canister portion 12 as described hereinafter.

The base 18 comprises two members which cooperate with one another to form a seal with the bottom of the canister. In particular, referring to FIGS. 2 and 3, the base includes an outer base member 20 and an inner base member 22. In the preferred embodiment, the outer base member 20 includes an internal thread 24 which cooperates with an external thread 26 on the inner base member 22. The outer base member 20 includes on its inner surface a flange or locking surface 28 which extends over the top of the circular flange 16 of the canister 12 as seen in FIG. 1. In the preferred embodiment of FIG. 1, as well as in the alternate embodiment of FIGS. 4, 5 and 6, and outer or top seal (not shown) may be provided between the surface 28 of the outer base member and the flange 16 of the canister 12. The seal, however, primarily provides a cushion and is not the primary seal which prevents leakage of the fluid from the canister 12.

Referring again to FIG. 2, the inner base member 26 includes a flat surface 32 generally at a location above the threaded portion 26. The flat surface 32 forms a seat for a gasket seal. In particular, referring to FIG. 1, a gasket 34 is positioned on the seat 32 so as to engage the upper surface of the seat and the lower inner surface of the flange 16 of the canister. The outer base member 20 is fitted over the flange 16 where its internal threads 24 engage the threads 26 on the inner base member whereby relative rotation of the outer base member 20 with respect to the inner base member 22 causes the outer base member to move downwardly on the threads moving the canister and flange 16 into engagement with the gasket 34 against the seat 32 of the inner base member thereby providing a complete seal for the canister.

With this construction, the canister can be opened and the filter cleaned or replaced by simply unscrewing the outer base member from the inner base member which permits removal of the inner base member 22 and access to the filter cartridge. However, it is generally desirable that such replacement efforts are conducted by qualified personnel as opposed to the average user. Therefore, the cooperating base elements 20 and 22 have been provided with a tamper-resistant or security means as described below. As illustrated in FIGS. 2 and 7, tamper-resistant means 40 includes lock means for preventing relative rotation of the inner and outer base elements 20 and 22 so that a special tool or key is required in order to open the water filter and remove the filter element from the canister 12. In particular, the security means 40 includes an aperture 42 which extends horizontally into the inner base member 22. The aperture 42 includes at its innermost end a tapered pipe thread which communicates with the interior region 44 of the inner base element. The pipe thread permits connection to a conventional fitting to the supply line. The tapered section 46 cooperates with a larger counter bore 48 which extends to the outer surface of the side wall of the inner base member 22.

The counter bore 48 in the preferred embodiment may be approximately 0.875 inches in diameter and aligns with a similarly shaped aperture 50 in the outer base member 20 when the filter is assembled with the appropriate gasket 34 forming a seal between the canister and the base. A special fitting or lack 60 is supplied which extends through the aperture 50 in the outer base member 20 and the counter bore 48 in the inner base member connecting with the pipe thread 46. The fitting 60 is threaded into the tapered pipe thread 46 and is sized so that a portion of the fitting 60 extends from the counter bore 48 into the aperture 50 in the outer base member 60. When installed in this manner, the fitting or lack 60 precludes relative rotation of the inner and outer base members 22 and 20.

The fitting 60 is also sized so that it does not extend outside the outer surface of the outer base member 20 so that it could be grasped with a pliers or other desirable tool. In addition, the fitting 60 includes a special keyway to cooperate with a complementary tool or key to permit removal of the fitting only by a qualified service man with the tool. A preferred embodiment of the keyway is illustrated in FIG. 8. As such, the locking system or security system 40 prevents the user from attempting to disassemble the filter.

Figure 5:
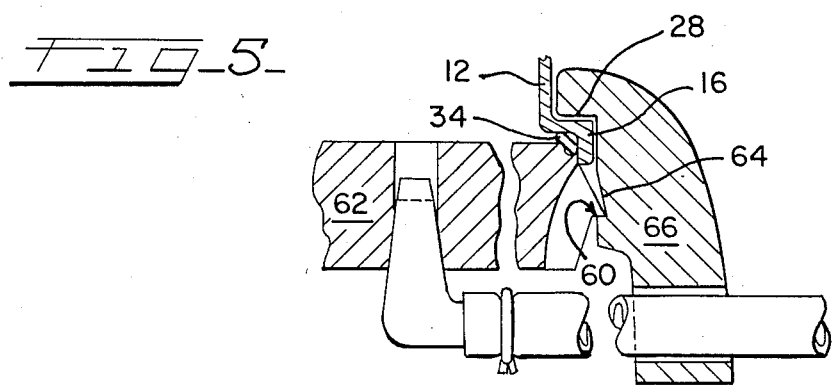
FIG. 5 is a cross-sectional view of another embodiment of the present invention.
Figure 6:
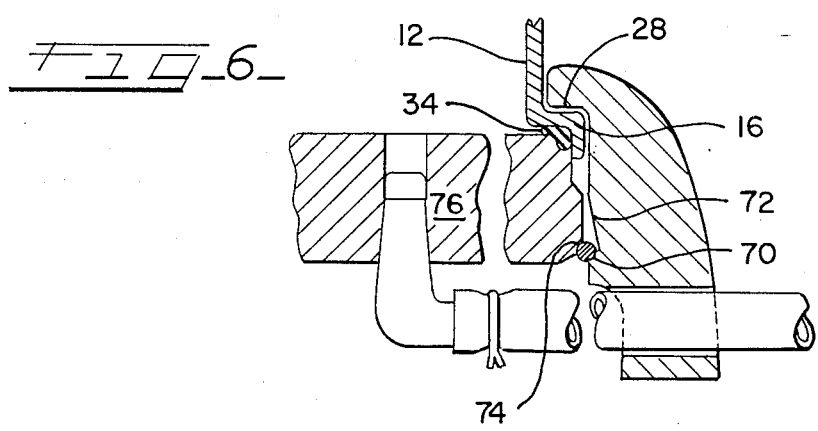
FIG. 6 is a cross-sectional view of yet another emobidment of the present invention.

Three alternate embodiments of the present invention are shown in FIGS. 4, 5 and 6. In FIG. 4, a smaller inner base element 52 is threaded in a similar manner to the outer base element 54 but includes a nipple or ridge 56 which assists in forming the seal at the junction with the flange 16 of the canister. In this embodiment, the design is shown without the security fitting in the event such a fitting was undesirable. In FIG. 5, an alternate embodiment is shown which provides a snap lock in place of the threaded fitting previously described. The snap lock includes a claw member 60 on the inner base element 62 and a cooperating notch or ratchet 64 on the external base element 66. In the alternate embodiment of FIG. 6, a steel lock ring 70 cooperates with a circular groove 72 on the integral surface of the external base member and a notch 74 on the lower side of the inner base element 76. In this manner, the inner base element is compressed and the lock ring is inserted to secure the inner base element in a sealing relationship with the canister 12.

The foregoing detailed description has been given for clearness of understanding only and no unnecessary limitations should be understood therefrom as some modifications will be obvious to those skilled in the art.

I claim:

1. A water filter including a canister portion for holding filter elements and granular activated carbon said canister portion including tap connection means, an external base element, an internal base element, means for sealing the internal base element with the canister, supply line connecting means, and lock means for receiving a key and for locking said inner base element to prevent removal thereof without said key.

2. The water filter of claim 1 further including securing means for said external base element to removably secure said internal base element and wherein said key-removable lock means comprises a key-removable lock for locking said external base element to prevent removable thereof without a key.

3. The water filter of claim 2 wherein said securing means comprises internal base member outer threads and external base member inner threads engagable with said internal base member outer threads.

4. The water filter of claim 3 wherein said internal base member includes a bore and said external base member includes an aperture alignable with said bore and wherein said key-removable lock comprises a removable fitting, said fitting including means for securing said lock to said internal base element and a keyway, said fitting extending through said bore and at least partially through said aperture.

5. The water filter of claim 4 wherein said means for securing said fitting to said internal base element comprises engagable threads disposed on the mating surfaces of said fitting and said bore.

6. The water filter of claim 5 wherein said fitting is disposed entirely within said outer base element.

7. The water filter of claim 6 wherein said fitting includes an aperture defining a conduit and wherein said fitting at least partially defines said supply line connection means.

* * * * *

UNITED STATES PATENT AND TRADEMARK OFFICE
CERTIFICATE OF CORRECTION

PATENT NO.  : 4,804,467
DATED       : February 14, 1989
INVENTOR(S) : Gus Losos

It is certified that error appears in the above-identified patent and that said Letters Patent is hereby corrected as shown below:

In column 2, between lines 33 and 34, please start a new paragraph beginning with the second occurrence of "As".

In column 2, line 53, please delete "lack" and substitute therefor --lock--.

In column 2, line 61, please delete "lack" and substitute therefor --lock--.

IN THE CLAIMS

In column 4, line 3, after "key" please insert --.--.

UNITED STATES PATENT AND TRADEMARK OFFICE
CERTIFICATE OF CORRECTION

PATENT NO. : 4,804,467
DATED : February 14, 1989
INVENTOR(S) : Gus Losos

It is certified that error appears in the above-identified patent and that said Letters Patent is hereby corrected as shown below:

In column 4, lines 8 and 9, please delete "removable" and substitute therefor --removal--.

Signed and Sealed this

Twenty-fourth Day of September, 1991

Attest:

HARRY F. MANBECK, JR.

Attesting Officer

Commissioner of Patents and Trademarks